United States Patent Office 3,239,534
Patented Mar. 8, 1966

3,239,534
SYNTHESIS OF BIS(DIHYDROCARBYLAMINO) HYDROCARBYLOXYMETHANES AND TETRAKIS(DIHYDROCARBYLAMINO) ETHYLENES AND SELECTED BIS(DIHYDROCARBYLAMINO) HYDROCARBYLOXYMETHANES
Hilmer E. Winberg, Wilmington, Del., assignor to E. I. du Pont de Nemours and Company, Wilmington, Del., a corporation of Delaware
No Drawing. Filed Feb. 13, 1963, Ser. No. 258,172
14 Claims. (Cl. 260—313)

This invention relates to a new process for the preparation of N,N,N',N'-tetrakis(hydrocarbyl)formamidinium salts with strong acids, to a new process for the preparation of bis(dihydrocarbylamino)hydrocarbyloxymethanes and to a new process for the synthesis of tetrakis(dihydrocarbylamino)ethylenes and more particularly to a new process for the synthesis of tetrakis(dimethylamino)ethylene. It especially relates to, and has as its principal objective, provision of the novel preparation of the above compounds from inexpensive reagents by a novel series of reactions culminating in the pyrolysis of the bis(dihydrocarbylamino)hydrocarbyloxymethanes.

Tetrakis(dimethylamino)ethylene (TMAE) is an old compound of interesting chemical and physical properties. It was first reported by Pruett et al., J. Am. Chem. Soc., 72, 3646 (1950). The method of preparation there given involved reaction between dimethylamine and chlorotrifluoroethylene. While this method proceeds satisfactorily, it involves relatively high synthesis cost because of the current relatively high price of the necessary chlorotrifluoroethylene intermediate. Pruett et al., moreover, are completely silent as to the possible synthesis of any other tetrakis(dihydrocarbylamino)ethylene or, of course, the properties thereof.

It has now been discovered that the tetrakis(dihydrocarbylamino)ethylenes can be prepared quite readily and cheaply by the pyrolysis of the corresponding bis(dihydrocarbylamino)hydrocarbyloxymethanes. These latter compounds can be prepared easily and cheaply from the relatively inexpensive and easily commercially available corresponding dihydrocarbylformamides, hydrocarbyl strong acid esters, dihydrocarbylamines, and a strong base, e.g., the alkali metal or alkaline earth metal hydrocarbyl oxides, all in accord with the following illustrative stoichiometry:

$$R_2X + R_2NCHO \longrightarrow R_2N\overset{OR}{\underset{|}{C}}HXR$$
$$\downarrow R_2NH$$
$$[R_2N]_2CHOR \overset{Base}{\longleftarrow} [R_2N]_2CHXR$$

wherein the R's, which can be alike or different, are used to represent monovalent, aliphatically saturated hydrocarbyl, i.e., hydrocarbon radicals of no more than 12 carbons each, which in the case of R's bonded to amino and/or amido nitrogen, can be together joined to form with the intervening nitrogen heterocycles of from 3 to 7 total ring members. The formula of the dihydrocarbylformamide reactant can thus be written as $R^1R^2NCHO$ or 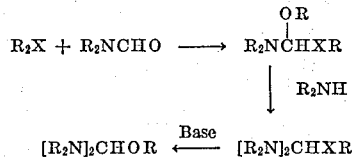

and that of the dihydrocarbylamine, as $R^3R^4NH$ or 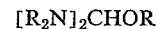 NH, $R^1$, $R^2$, $R^3$ and $R^4$, alike or different, being monovalent, aliphatically saturated hydrocarbyl radicals of no more than 12 carbons and Q and $Q^1$, also alike or different, being divalent aliphatically saturated hydrocarbyl radicals of up to 12 carbons forming rings of 3–7 atoms with the depicted nitrogen.

It is intended in the foregoing that the schematic formula represented by $R_2X$ should be interpreted as including quaternary agents, broadly and more specifically strong acid esters, i.e., organic esters of strong acids inclusive of both organic and inorganic, such as the sulfate esters, e.g., dimethyl, diethyl or the like other hydrocarbyl sulfate esters, the hydrocarbyl hydrocarbon sulfonate esters, e.g., methyl p-toluenesulfonate, the hydrocarbyl esters of other strong inorganic acids and the like. X is preferably sulfate or sulfonate.

Useful strong bases in the foregoing stoichiometry are the aliphatically saturated hydrocarbyl oxides of the alkali and alkaline earth metals of atomic numbers from 3–56, inclusive. Particularly preferred because of generally greater reactivity are the aliphatically saturated hydrocarbyl oxides of the alkali metals of atomic numbers from 3–55, inclusive, and, most especially, lithium, sodium and potassium, i.e., the alkali metals of atomic numbers 3–19, inclusive. These bases can be supplied to the reaction zone as such or alternatively can be generated in situ, e.g., by charging an hydroxy-substituted hydrocarbon, i.e., a hydrocarbyl alcohol, and an alkali metal carbonate or the like.

It is also to be understood from the foregoing representation that in the case of the third reactant, i.e., the final entering secondary amine represented by the structure $R_2NH$, this formula is intended to include the corresponding diamines, perhaps better illustrated by the formula $R^5NH(CH_2)_nNHR^6$ wherein $R^5$ and $R^6$ are aliphatically saturated hydrocarbyl radicals of up to 12 carbons expressly including monovalent alkyl, aryl, aralkyl, alkaryl, and cycloalkyl of no more than 12 carbons each and preferably no more than 8 carbons each, and $n$ is an integer from 2 to usually no more than 4.

A preferred aspect of the present process invention comprises a four-step synthesis of the tetrakis(dihydrocarbylamino)ethylenes via the bis(dihydrocarbylamino)hydrocarbyloxymethanes, in turn via the tetrakis(hydrocarbyl)formamidiniumhydrocarbyl sulfates, in turn via hydrocarbyloxymethanes, in turn via the tetrakis(hydrocarbyl sulfates, in turn from the hydrocarbyl sulfates and the N,N-dihydrocarbylformamides, in accord with the following illustrative stoichiometry:

$$R_2SO_4 + R_2NCHO \longrightarrow R_2N\overset{OR}{\underset{|}{C}}H-OSO_3R$$
$$\downarrow R_2NH$$
$$[R_2N]_2CHOR \overset{MOR}{\longleftarrow} [R_2N]_2CHOSO_3R$$

where R has its previous significance and M is a metal of Groups I–A and II–A of atomic number 3 to 56 inclusive. It will be noted that the general formula of the final product of this series of reactions, i.e., $$[R_2N]_2CHOR$$

can be divided into the formulae $[R^3R^4N]_2CHOR$, 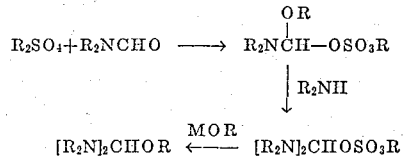, and 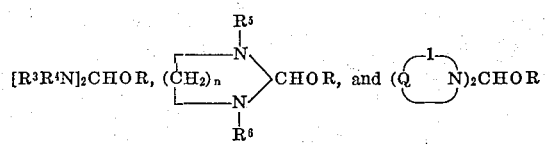

where R, $R^3$, $R^4$, $R^5$, $R^6$, $Q^1$ and $n$ have their above-indicated means.

These bis(dihydrocarbylamino)hydrocarbyloxymethanes can be directly and easily converted by pyrolysis to the desired tetrakis(dihydrocarbylamino)ethylenes in accord with the following illustrative stoichiometry:

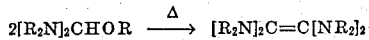
$$2[R_2N]_2CHOR \xrightarrow{\Delta} [R_2N]_2C{=}C[NR_2]_2$$

A particularly preferred aspect of the present invention lies in the synthesis of an especially outstanding member of the tetrakis(dihydrocarbylamino)ethylenes, namely, the unusual first member of the series, i.e., tetrakis(dimethylamino)ethylene. This particularly useful compound can be easily and cheaply prepared by the reaction between the inexpensive and easily commercially available in tonnage lots dimethylformamide, dimethyl sulfate, dimethylamine, and the requisite alkali metal or alkaline earth metal hydrocarbyl oxide, particularly the former, and especially sodium methoxide, all in accord with the following illustrative stoichiometry:

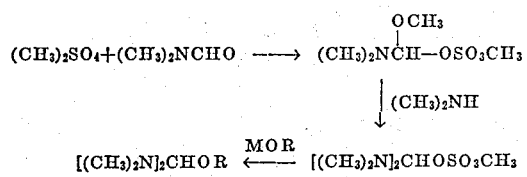

followed by pyrolysis of the intermediate bis(dimethylamino)-hydrocarbyloxymethane in accord with the following illustrative stoichiometry:

$$2[(CH_3)_2N]_2CHOR \rightarrow [(CH_3)_2N]_2C{=}C[N(CH_3)_2]_2$$

The following examples, in which the parts given are by weight, are submitted to further illustrate but not to limit the invention.

Example I

A mixture of 73 parts of dimethylformamide and 126 parts of dimethyl sulfate was heated at 60–80° C. for 2.25 hours while being protected from atmospheric moisture. The reaction mixture was cooled and 50.5 parts of dimethylamine was bubbled in with stirring while keeping the temperature below 30° C. by intermittent external cooling. When the addition was complete, the mixture was heated to 70° C. for 15 minutes and the pressure was lowered to 10 mm. of mercury. The resultant distillate was collected in a solid carbon dioxide cooled receiver and redistilled to afford 23 parts (72% of theory) of methanol, identified by boiling point and infrared spectrum.

To the cooled, stirred residue from the above vacuum distillation [i.e., crude bis(dimethylamino)methyl methyl sulfate, believed to be mostly in the salt form, i.e., N,N,N',N'-tetramethyl formamidinium methyl sulfate] was added 54 parts of solid sodium methoxide, portionwise and with cooling to keep the temperature of the reaction mixture below 40° C. After standing for 12 hours, the resulting reaction mixture was heated to 100° C. under a pressure of about 15 mm. of mercury, and the volatile material was collected in a solid carbon dioxide cooled receiver. Distillation of this material in a small Vigreaux still gave 96.5 ml. of distillate, boiling range 101–129° C. The residue from the distillation contained TMAE. When a portion of the residue was poured on paper, a chemiluminescent spot was formed. Likewise a portion of the residue shaken with water formed a chemiluminescent upper layer of TMAE.

The above 96.5 ml. of distillate was redistilled in a 250 mm. by 10 mm. distillation column equipped with a total reflux, partial take-off head packed with Hastelloy "B" Heli-Pak (size 0.05 in. by 0.1 in.). There was obtained 22.7 parts of dimethylformamide dimethylacetal, B.P. 102.5–105° C.; $n_D^{26}$, 1.3951, identified by boiling point and by comparison of its infrared spectrum with that of a known sample.

Continued distillation after the isolation of the dimethylacetal gave 33.8 parts of bis(dimethylamino) methoxymethane, boiling at 126° C.; $n_D^{26}$, 1.4180. The infrared spectrum thereof contained absorption peaks characteristic of the —C—O—C— group.

*Analysis.*—Calcd. for $C_6H_{16}N_2O$: C, 54.5; H, 12.2; N, 21.2. Found: C, 54.1, 54.5, 54.9; H, 11.7, 12.1, 12.2; N, 21.5, 21.7.

The residue remaining after removal of the bis(dimethylamino)methoxymethane comprised 9.7 parts of crude TMAE. Further distillation afforded 2 parts of pure TMAE, B.P. 93° C. under a pressure corresponding to 25 mm. of mercury. TMAE was identified by its boiling point, by a comparison of infrared spectrum with that of a known sample of TMAE, and by chemiluminescence in air.

Example II

To a suspension of 84.8 g. (0.4 mole) of bis(dimethylamino)methyl methyl sulfate in 200 ml. of dry 1,2-dimethoxymethane was added 21.6 g (0.4 mole) of dry powdered sodium methoxide. The mixture was stirred 20 hr. at 24–25° C. The volatile product was removed by distillation under reduced pressure. The volatiles were fractionated at atmospheric pressure to give a forerun boiling at 64–132° C. The residue was distilled under reduced pressure to give 3 ml. of crude tetrakis(dimethylamino)ethylene, B.P. 92–94° C. under a pressure corresponding to 26 mm. of mercury, equivalent to a 6% conversion.

Example III

A charge of 13.2 g. of bis(dimethylamino)methoxymethane was passed through a 1.5 cm. by 20 cm. Vycor tube at atmospheric pressure and 220–295° C. over a period of 55 min. The output contained TMAE as shown by the characteristic fluorescence activated by ultraviolet irradiation.

Example IV

A charge of 7.9 g. of bis(dimethylamino)methoxymethane was passed through a 1.5 cm. by 20 cm. Vycor tube in a dry nitrogen carrier stream at 340° C. over a period of 30 min. The output contained TMAE as shown by the characteristic fluorescence activated by ultraviolet irradiation.

Example V

A charge of 8.7 g. of bis(dimethylamino)methoxymethane was passed through a 1.5 cm. by 20 cm. Vycor tube packed with 5 mm. by 6 mm. pieces of quartz tubing at 295° C. under 10 mm. of mercury pressure over a period of 36 min. TMAE was formed (about 3% conversion) as shown by the characteristic fluorescence activated by ultraviolet irradiation and by vapor phase chromatography.

Example VI

A mixture of 36.5 parts of dimethylformamide and 63 parts of dimethyl sulfate was heated at 60–80° C. for 2 hours while being protected from atmospheric moisture. The reaction mixture was cooled and 71 parts of pyrrolidine was added dropwise over 30 minutes with stirring and external cooling to keep the temperature below 30° C. When the addition was complete, the reaction mixture was heated to reflux for 30 minutes. During this time 9.7 parts of dimethylamine, identified by boiling point and its odor, were collected in a solid carbon dioxide cooled receiver. The pressure on the reaction mixture was then lowered to 8 mm. of mercury and additional volatile material was collected in the cold receiver. Redistillation of the volatile material gave an additional 6.8 parts of dimethylamine (total of 73% of theory) and 15.8 parts crude methanol (99% of theory).

To the cooled, stirred residue of N,N,N',N'-bis-(tetramethylene)formamidinium methyl sulfate was added 27 parts of solid sodium methoxide, portionwise and with cooling to keep the temperature of the reaction mixture below 40° C. After standing for 12 hours the reaction mixture was extracted with 88 parts of benzene, the mixture filtered under nitrogen and the filtrate distilled. There was obtained 20 parts (22% of theory) of bis(N-pyrrolidinyl)methoxymethane boiling at 80° C. under a pressure corresponding to 2 mm. of mercury, identified by boiling point and by comparison of its infrared spectrum with that of a known sample.

A sample of the bis(N-pyrrolidinyl)methoxymethane was heated under nitrogen in a bath at 225° C. for 1 hour, distilling out methanol as it was formed in the pyrolysis. The product was cooled, then crystallized from ethyl acetate under nitrogen to give needles of tetrakis(N-pyrrolidinyl)ethylene melting at 90–93° C. The needles showed the characteristic chemiluminescence of this peraminoethylene on exposure to air.

From the foregoing stoichiometry it is apparent that the over-all reaction is an extremely simple one and that the requisite bis(dihydrocarbylamino)hydrocarbyloxymethanes and the tetrakis(hydrocarbyl)formamidinium hydrocarbyl strong acid esters (especially the sulfates) intermediate thereto, and the dihydrocarbylaminohydrocarbyloxymethane hydrocarbon strong acid esters (particularly the sulfates) likewise intermedaite, respectively, thereto can all be prepared in sequence by first reacting a hydrocarbon strong acid ester with an N,N-dihydrocarbylformamide, followed by reaction with the requisite dihydrocarbylamine, followed by reaction of the thus formed formamidinium strong acid salt with the requisite base, followed finally by pyrolysis of the intervening bis(dihydrocarbylamino)hydrocarbyloxymethane. Particularly preferred as useful reagents are the dihydrocarbylsulfates and the alkail metal and alkaline earth metal hydrocarbyl oxides in conjunction with the desired amino hydrogen-bearing dihydrocarbylamine.

By varying the nature of the alkali metal hydrocarbyl oxide coreactant, the various bis(dimethylamino)hydrocarbyloxymethanes can be made. Thus, in the previously discussed stoichiometry by substitution of, for instance, lithium dodecyl oxide, there will be obtained the desired bis(dimethylamino)dodecyloxymethane. Similarly, but substituting potassium p-ethylphenoxide, there will be obtained the desired bis(dimethylamino)p-ethylphenoxymethane. Similarly, by substituting rubidium β-phenylethoxide, there will be obtained the desired bis-(dimethylamino)-β-phenylethoxymethane. Similarly, by substituting cesium cyclohexyl oxide, there will be obtained the desired bis(dimethylamino)cyclohexyloxymethane. Likewise, by suitable substitution of the necessary alkali metal hydrocarbyl oxides, i.e., the alkali metal salts of the desired hydrocarbyl alcohols and phenols, there will be obtained the desired bis(dimethylamino)hydrocarbyloxymethanes. The only variant involved in these necessary intermediates is the specific alkali metal and requisite hydrocarbyl alcohol and phenol used. As should be apparent from the stoichiometry, the alkali metal does not appear in the final product, but the hydrocarbyloxy moiety of the hydrocarbyl alcohol and phenol does appear as the oxy substituent on the bis(dimethylamino)methane fragment.

In the foregoing process of preparing these products as outlined in the several equations given, the first step is the reaction between the hydrocarbyl strong ecid ester and the requisite N,N-disubstituted formamide. This step, which is preferentially effected using the dihydrocarbyl sulfate esters, is carried out directly simply by mixing the two specific reagents and heating mildly, e.g., at 60–80° C. for a few hours, e.g., two, or alternatively by holding the two reactants at room temperature with suitable stirring for one or two days. The second step of this multistep process, i.e., the reaction between the requisite dihydrocarbylamine and the dihydrocarbylaminohydrocarbyloxymethane strong acid ester, particularly the dihydrocarbylaminohydrocarbyloxymethane hydrocarbon sulfates formed from the first charged formamide and hydrocarbon sulfate ester, is effected directly simply by mixing the requisite hydrogen-bearing secondary amine and the dihydrocarbylaminohydrocarbyloxymethane hydrocarbon sulfate. The reaction is achieved readily without the application of any external driving force. Normally, the reaction is mildly exothermic and proceeds to substantial completion in a very short time, generally being effected at a rate commensurate with the rate of addition of the reagents.

The next step in the reaction sequence, namely the formation of the bis(dihydrocarbylamino)hydrocarbyloxymethanes from the tetrakis(hydrocarbyl)formamidinium hydrocarbon acid salts (particularly the sulfates), by reaction thereon with the strong base is also mildly exothermic and will also proceed with the reagents at room temperature at a rate commensurate with the rate of addition of the reagents. The thus formed bis(dihydrocarbylamino)hydrocarbyloxymethanes are isolated from the reaction mixture by conventional techniques, including the obvious ones of distillation, extraction, crystallization, and the like, depending on the physical properties of the final products which will vary from liquid to solid, depending on the size of the hydrocarbyl substituents on the amine nitrogens and in less part on the size of the hydrocarbon radical in the hydrocarbyloxy moiety.

In addition to the aforesaid described intermediates in the multi step synthesis of tetrakis(dihydrocarbylamino) ethylenes, there can also be used other hydrocarbyl strong acid esters, N,N-dihydrocarbylsubstitutedformamides, and dihydrocarbyl secondary amines. More particularly, there can be used such other secondary amines as ethyleneimine, i.e., aziridine, azetidine, i.e., azacyclobutane, perhydroazepine, $\Delta^3$-pyrroline, i.e., 2,5-dihydroazoline, N,N'-di-n-dodecyl-ethylenediamine and the like. Using these additional secondary amines in the process as previously described, there will be obtained the following illustrative tetrakis(cyclic and acylic disubstitutedamino)ethylenes: 1,1,2,2 - tetrakis(1-aziridinyl) ethylene, 1,1,2,2 - tetrakis(1 - azetidinyl)ethylene, 1,1,2,2-tetrakis(1 - hexahydroazepinyl)ethylene, 1,1,2,2 - tetrakis- (1 - 2,5 - dihydroazolinyl)ethylene, i.e., 1,1,2,2 - tetrakis- (1 - $\Delta^3$ - pyrrolinyl)ethylene, 1,1',3,3' - tetra - n- dodecyl - $\Delta^{2,2'}$ - bi(imidazolidine) and the like.

Using the reaction conditions and variables outlined in the foregoing, on reaction with such cyclic amines or disubstituted diamines as N,N'-dimethylethylenediamine, pyrrolidine, morpholine, N,N'-dimethyl-1,3-propanediamine, and the like, there will be formed the following bis(disubstituted - amino)monohydrocarbyloxyhydrocarbons:

1,3-dimethyl-2-hydrocarbyloxyimidazoline,
α,α-bis(N-pyrrolyidinyl)hydrocarbyloxymethane,
α,α-bis(N-pyrrolidinyl)hydrocarbyloxymethane,
1,3-dimethyl-2-hydrocarbyloxyhexahydropyrimidine,
and the like.

These new bis(disubstitutedamino)monohydrocarbyloxyhydrocarbons are strong bases and accordingly are useful for catalysis of base-catalyzed reactions, especially in organic systems due to their solubility therein, and particularly in catalyzing such reactions as: the addition of alcohols to α-β unsaturated nitriles, cyanoethylation reactions in general using acrylonitrile, additions to activated double bonds such as illustrated in U.S. Patent No. 2,822,376, and the like. They are also useful as water scavengers in organic systems, particularly in view of their good organic solubility, and especially because unlike other organic-soluble water scavengers they result in non-corrosive products.

These new products find use as chemical intermediates in condensing with active methylene compounds, forming dihydrocarbylaminoethylene derivatives. More particularly, these new products can be condensed with active methylene compounds, such as malononitrile and the like, to form the dihydrocarbylaminomethylene malononitrile as illustrated with different intermediates but with the same product by Eiden, Angew. Chem., 72, 77 (1960) and by Hafner et al., ibid., 71, 672 (1959).

These new bis(disubstitutedamino)monohydrocarbyloxyhydrocarbons are also useful in the formation of the corresponding tetrakis(disubstitutedamino)ethylenes by direct heating. The tetrakis(disubstitutedamino)ethylenes are generically useful as high energy fuels for rocket and space propulsion. These tetrakis(disubstitutedamino)ethylenes have specific impulses in the ranges of those of hydrazine and methylhydrazine with $N_2O_4$, $HN_3$, or other like strong oxidizing agents under rocket motor conditions.

The tetrakis(disubstitutedamino)ethylenes (see my copending application Ser. No. 174,404, filed February 20, 1962) are especially useful as high energy fuels since they exhibit not only high specific impulses but also high heats of combustion. Thus, the heat of combustion of 1,3'-diethyl-1',3-dimethyl-$\Delta^{2,2'}$-bi(imidazolidine) is 8770 cal./g. and that of 1,1',3,3'-tetraethyl-$\Delta^{2,2'}$-bi(imidazolidine) is 8970–9010 cal./g. The 1,1',3,3'-tetramethyl-$\Delta^{2,2'}$-bi-(imidazolidine) is so active that it spontaneously fires when pressured to about 40 p.s.i. with oxygen. Accordingly, a specific value for the heat of combustion thereof has not been obtained, but it is obviously high.

These new tetrakis(disubstitutedamino)ethylenes are also generically useful as moderate to strong organic reducing agents. Thus, they can successfully carry out such reductions as

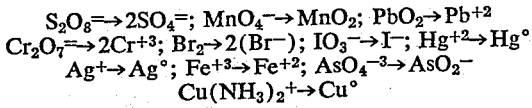

and the like.

These new tetrakis(disubstitutedamino)ethylenes are also generically useful as oxygen scavengers and serve thereby, for instance, as gasoline stabilizers, especially for the more conventional leaded gasolines, to prevent deterioration of the fuels on standing. The tetrakis(disubstitutedamino)ethylenes are not only useful as oxygen scavengers but form basis for a suitable analytical procedure for determining the amount of oxygen in a system by simply putting a known quantity of the aminoethylene in the system in question and determining the amount of carbonyl formed when reaction was complete.

As is apparent from the foregoing discussion and the specific fully detailed examples, the pyrolysis can be carried out quite simply and directly. Normally, temperatures of at least about 80° C. will be required and temperatures up to 200–300° C. can also be used, with reduced pressures being preferably also used in the higher temperature ranges. As is apparent, the lower boiling (with respect to the desired tetrakis(dimethylamino)ethylene product) hydrocarbyl alcohol or phenol corresponding to the hydrocarbyloxy moiety of the bis(dimethylamino)hydrocarbyloxymethane intermediate is removed by distillation. Any type of distillation equipment can be used. Alternatively, as illustrated in the examples, the pyrolysis reaction can be carried out in a hot tube at elevated temperatures and more rapid throughput rates. An undesirable reaction to be minimized for in these higher temperature operations is reaction of the hydrocarbyl alcohol or phenol with the desired ethylene product.

While, as illustrated in these foregoing examples, the pyrolysis reaction can be carried out without any added solvent or diluent, it is generally preferred that an inert solvent or diluent be present. This material presumably serves only as a regulator for the heat transfer required, and any inert organic material, liquid at the pyrolysis temperatures being used, is suitable. Normally, the conventional inert organic solvents, liquid at room temperature, will be used. Of these, a particularly preferred class are the normally liquid aromatic hydrocarbons.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing a tetrakis(dihydrocarbylamino)ethylene which comprises sequentially:
   (1) reacting together
      (a) a hydrocarbyl ester of an acid of the group consisting of sulfuric and sulfonic acids, all hydrocarbyl groups being monovalent, aliphatically saturated radicals of up to 12 carbons, and
      (b) an N,N-dihydrocarbylformamide of the group consisting of $R^1R^2NCHO$ and $QNCHO$, $R^1$ and $R^2$ being monovalent, aliphatically saturated hydrocarbyl radicals of up to 12 carbons and Q being a divalent aliphatically saturated hydrocarbyl radical of up to 12 carbons forming with the depicted nitrogen a ring of 3–7 atoms;
   (2) reacting the reaction mixture from (1) with a secondary amine of the group consisting of $R^3R^4NH$, $R^5NH(CH_2)_nNHR^6$ and $Q^1NH$, $R^3$ and $R^4$ being monovalent, aliphatically saturated hydrocarbyl radicals of up to 12 carbons, $R^5$ and $R^6$ being monovalent aliphatically saturated hydrocarbyl radicals of up to 8 carbons, $n$ being an integer between 2 and 4, inclusive, and $Q^1$ being a divalent, aliphatically saturated hydrocarbyl radical of up to 12 carbons forming with the depicted nitrogen a ring of 3–7 atoms;
   (3) reacting the reaction mixture from (2) with an aliphatically saturated hydrocarbyl oxide of up to 12 carbons of alkali and alkaline earth metals of atomic number 3–56, inclusive; and
   (4) raising the temperature of the reaction mixture from (3) and recovering the tetrakis(dihydrocarbylamino)ethylene therefrom.

2. The process of preparing tetrakis(dimethylamino)ethylene which comprises sequentially:
   (1) reacting together (a) a hydrocarbyl ester of up to 12 carbons of an acid of the group consisting of sulfuric and sulfonic acids and (b) dimethylformamide;
   (2) reacting the reaction mixture from (1) with dimethylamine;
   (3) reacting the reaction mixture from (2) with an aliphatically saturated hydrocarbyl oxide of up to 12 carbons of alkali and alkaline earth metals of atomic number 3–56, inclusive; and
   (4) raising the temperature of the reaction mixture from (3) and recovering tetrakis(dimethylamino) ethylene therefrom.

3. The process of preparing tetrakis(n-pyrrolidinyl)ethylene which comprises sequentially:
   (1) reacting together (a) a hydrocarbyl ester of up to 12 carbons of an acid of the group consisting of sulfuric and sulfonic acids and (b) dimethylformamide;
   (2) reacting the reaction mixture from (1) with pyrrolidine;
   (3) reacting the reaction mixture from (2) with an aliphatically saturated hydrocarbyl oxide of up to 12 carbons of alkali and alkaline earth metals of atomic number 3–56, inclusive; and
   (4) raising the temperature of the reaction mixture from (3) and recovering tetrakis(N-pyrrolidinyl)ethylene therefrom.

4. The process of preparing a bis(dihydrocarbylamino)hydrocarbyloxymethane which comprises reacting
   (1) an aliphatically saturated hydrocarbyl oxide of up to 12 carbons of alkali and alkaline earth metals of atomic number 3–56, inclusive; with
   (2) an N,N,N',N'-tetrakis(hydrocarbyl)formamidinium salt of an acid of the group consisting of sulfuric and sulfonic acids, all hydrocarbyl groups in said salt being aliphatically saturated radicals of no more than 12 carbons.

5. The process of preparing a bis(dimethylamino)hydrocarbyloxymethane which comprises reacting bis(dimethylamino)methyl methyl sulfate with an aliphatically saturated hydrocarbyl oxide of up to 12 carbons of alkali and alkaline earth metals of atomic number 3–56, inclusive.

6. The process of claim 5 for preparing bis(dimethylamino)methoxymethane employing an alkali metal methoxide.

7. The process of preparing bis(N-pyrrolidinyl)methoxymethane which comprises reacting N,N,N',N'-bis(tetramethylene)formamidinium methyl sulfate with an aliphatically saturated hydrocarbyl oxide of up to 12 carbons of alkali and alkaline earth metals of atomic number 3–56, inclusive.

8. The process of claim 7 employing an alkali metal methoxide.

9. The process of preparing tetrakis(dimethylamino)ethylene which comprises pyrolyzing a bis(dimethylamino)hydrocarbyloxymethane, the hydrocarbyl radical being an aliphatically saturated radical of no more than 12 carbons.

10. The process of preparing tetrakis(dimethylamino)ethylene which comprises pyrolyzing bis(dimethylamino)methoxymethane.

11. The process of preparing tetrakis(N-pyrrolidinyl)ethylene which comprises pyrolyzing a bis(N-pyrrolidinyl)hydrocarbyloxymethane, the hydrocarbyl radical being an aliphatically saturated radical of no more than 12 carbons.

12. The process of preparing tetrakis(N-pyrrolidinyl)ethylene which comprises pyrolyzing bis(N-pyrrolidinyl)methoxymethane.

13. A bis(dimethylamino)hydrocarbyloxymethane wherein the hydroxycarbyl group has up to 12 carbons.

14. Bis(dimethylamino)methoxymethane.

No references cited.

NICHOLAS S. RIZZO, *Primary Examiner.*

CARL D. QUARFORTH, HENRY R. JILES, MARY O'BRIEN, *Assistant Examiners.*